Sept. 29, 1964  E. A. BRASS  3,150,544
MULTI-SPEED GEAR REDUCTION TRANSMISSION
Filed April 25, 1963  4 Sheets-Sheet 1
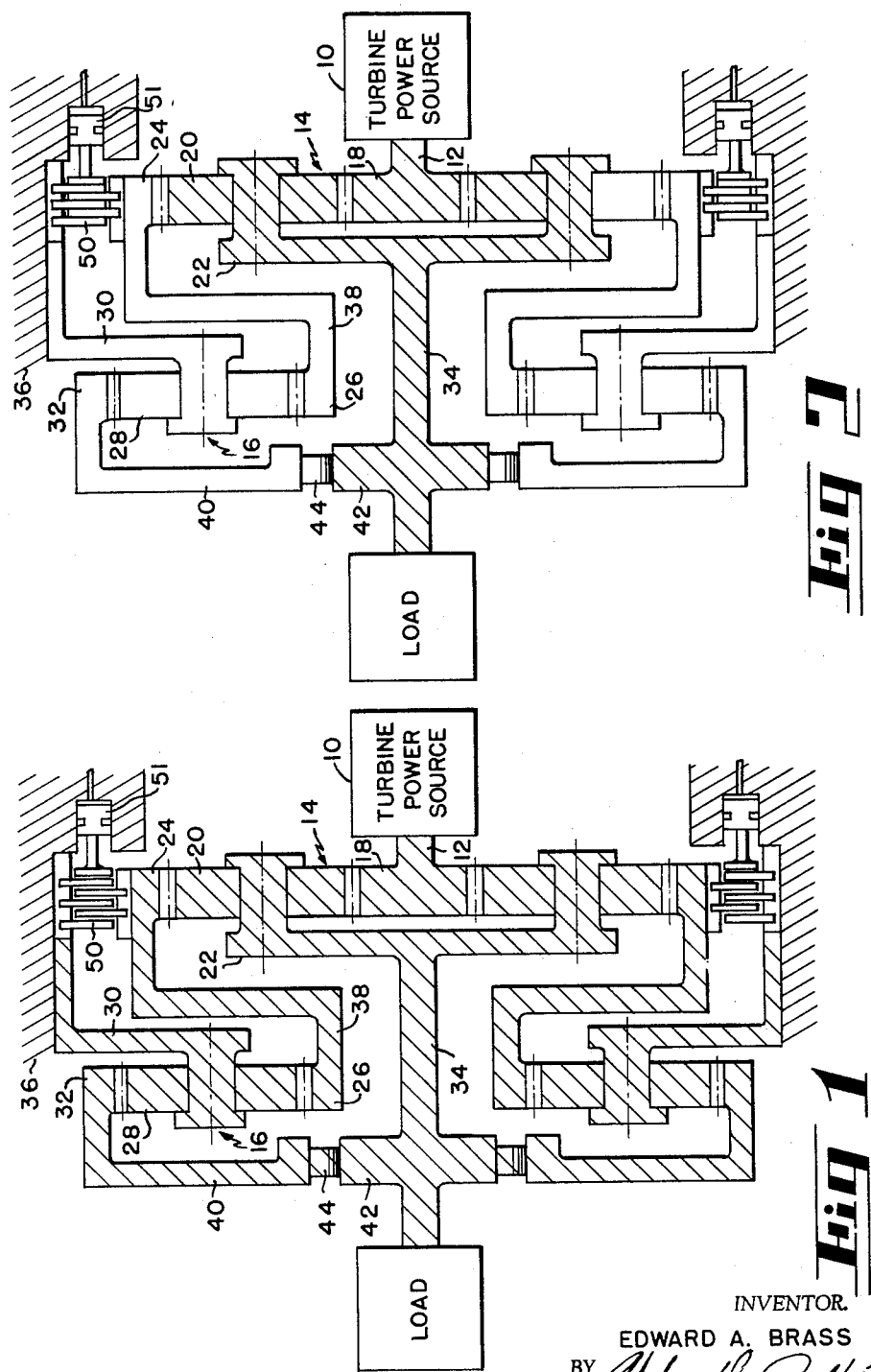
INVENTOR.
EDWARD A. BRASS
BY
ATTORNEYS.

Sept. 29, 1964     E. A. BRASS     3,150,544

MULTI-SPEED GEAR REDUCTION TRANSMISSION

Filed April 25, 1963            4 Sheets-Sheet 2

INVENTOR.
EDWARD A. BRASS
BY
ATTORNEYS.

Sept. 29, 1964  E. A. BRASS  3,150,544
MULTI-SPEED GEAR REDUCTION TRANSMISSION
Filed April 25, 1963  4 Sheets-Sheet 3
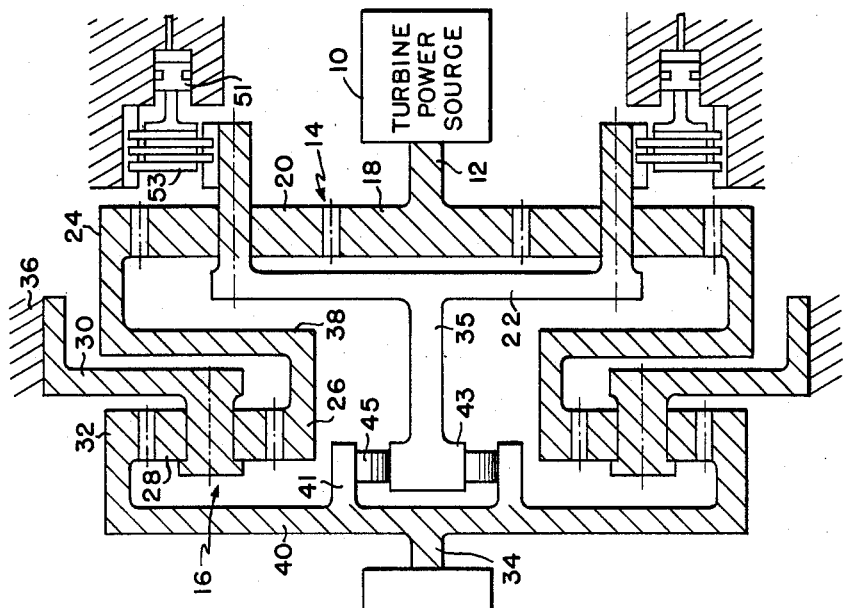
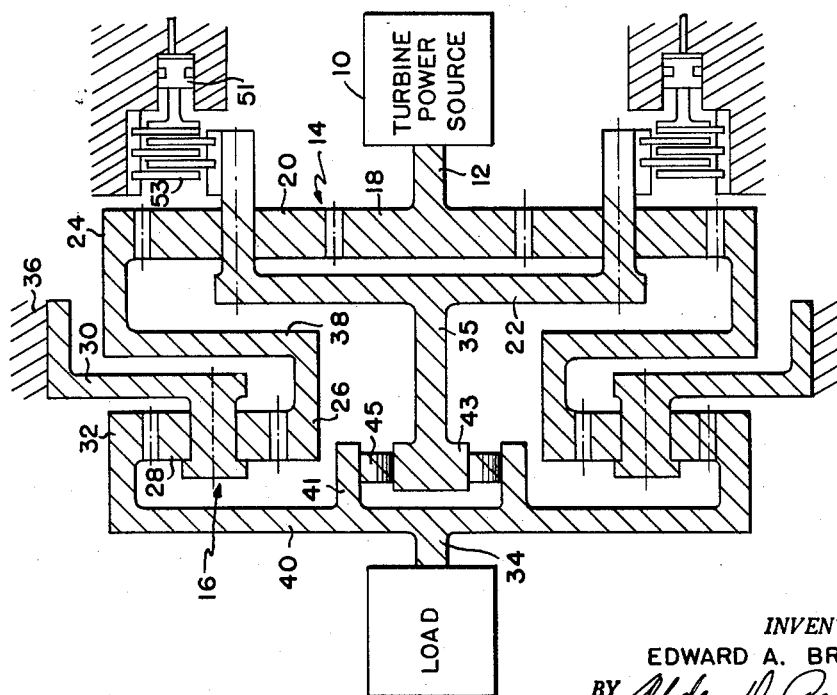
INVENTOR.
EDWARD A. BRASS
BY
ATTORNEYS.

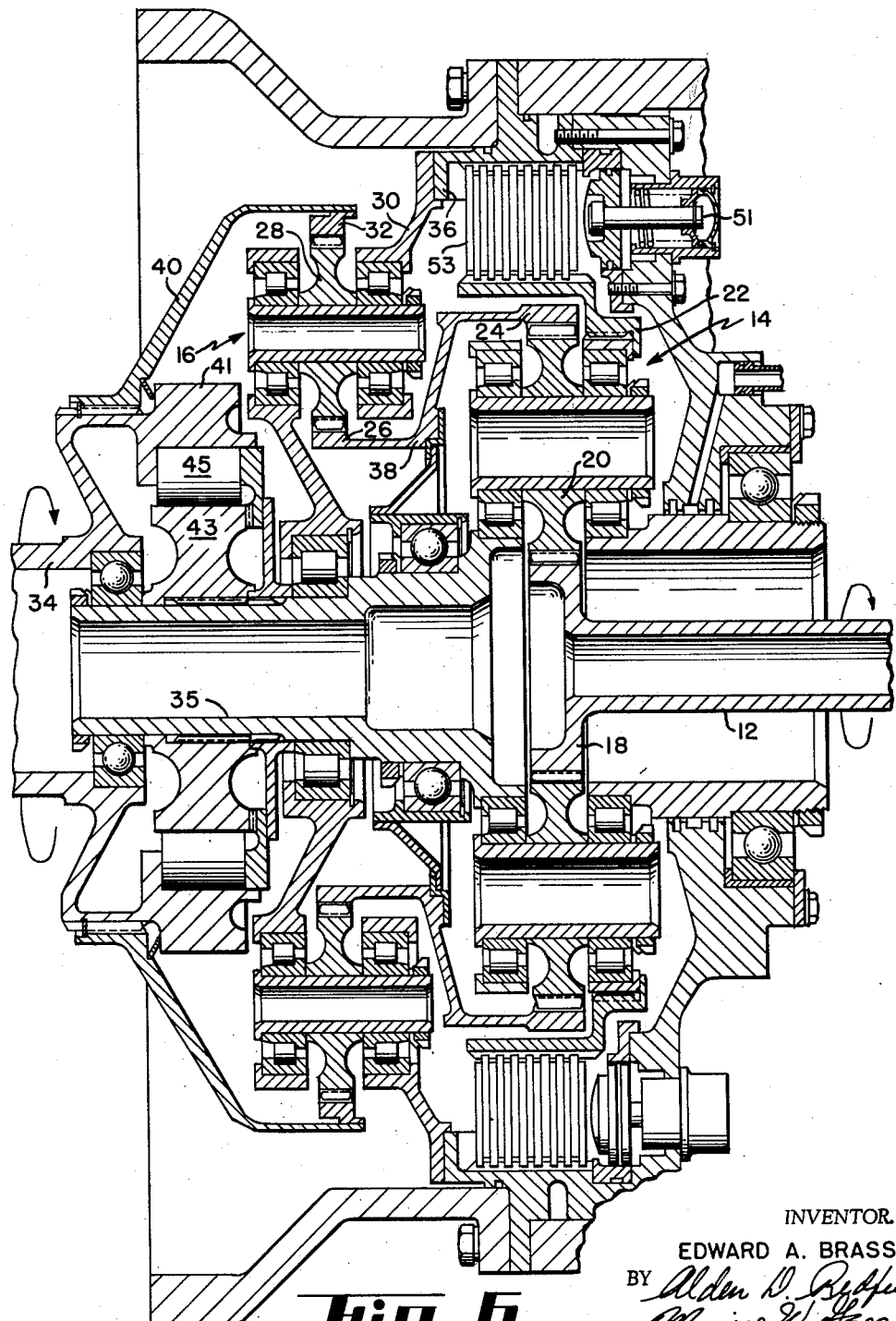

United States Patent Office 3,150,544
Patented Sept. 29, 1964

1

3,150,544
MULTI-SPEED GEAR REDUCTION
TRANSMISSION
Edward A. Brass, Norwalk, Conn., assignor to Avco
Corporation, Stratford, Conn., a corporation of
Delaware
Filed Apr. 25, 1963, Ser. No. 275,618
3 Claims. (Cl. 74—762)

This invention relates to a multi-speed gear reduction transmission providing at least two gear ratios, with the lower output shaft speed effected by a so-called split-power gear reduction combined with a relatively simplified gear ratio changing arrangement for accomplishing higher output shaft speed.

Reference is made to my Patent 3,062,073, issued November 6, 1962, in which there is disclosed a two-stage split-power reduction gear which has inherent advantages for large reductions in gear ratio, as set forth therein, the split-power arrangement reducing the load on the gear teeth, avoiding extremely high rotative speed of the elements while accomplishing a reduction from a very high rotative speed, such as is experienced in a gas turbine type of installation.

My copending application, Serial No. 189,638, filed April 23, 1962, now Patent No. 3,100,405 issued August 13, 1963, shows one means of obtaining a variation in the gear ratio of a split power arrangement, but by the use of at least one additional gear train in addition to the two-stage split-power arrangement of Patent 3,062,073.

It is the concept of the invention herein disclosed that a two-gear-ratio transmission can be accomplished with an addition of a relatively small number of mechanical elements to the two-stage split-power reduction gear, if the split-power arrangement is used for the low output shaft speed and the higher output shaft speed ratio accomplished by providing a brake on one of the components of the primary gear-set stage of the two-stage split-power arrangement. Such a brake is emloyed in combination with a one-way drive in the connection to the output shaft, so placed as to permit engagement of the brake in completing the drive connection. The result is a very satisfactory, two-speed arrangement without the use of an additional gear-set stage over the basic two-stage split-power gear train primarily used for low speed. Such combination of mechanism accomplishes a two-gear ratio type of selective gear reduction with a split-power drive in the low gear by allowing freedom of rotation of said primary gear-set stage components for the low gear condition and braking certain of said components to hold against rotation for the higher gear ratio. The arrangement is a comprise whereby the advantages of the split-ment is a compromise whereby the advantages of the split-power arrangement are available in the large gear reduction condition where most needed.

The principles of invention will be further disclosed by more detailed description of an illustrative embodiment and by reference to the accompanying drawings forming a part hereof and wherein:

FIGURE 2 is a schematic showing of the same mechanism as shown in FIGURE 1, but with a brake in operation holding the primary stage ring gear against rotation,

Figure 1:
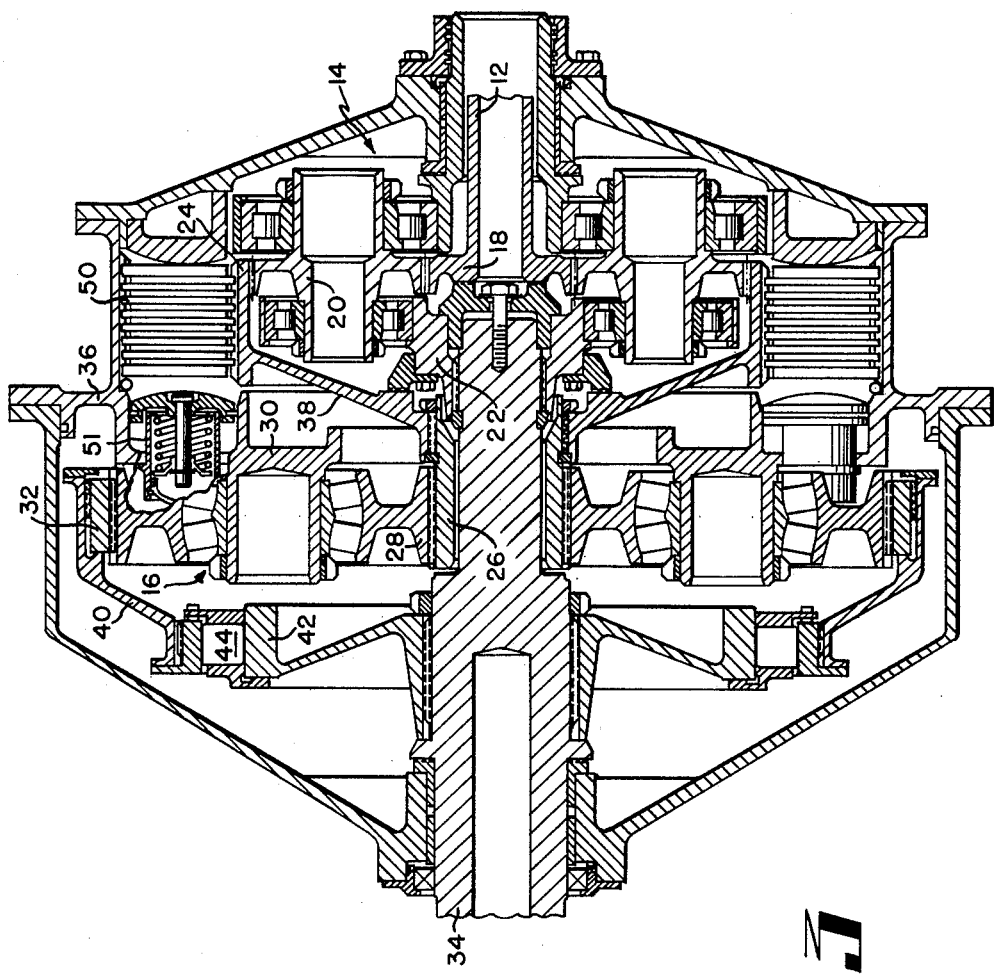
FIGURE 1 is a schematic showing of a two gear-set stage split-power reduction gear with the elements of the primary stage free to rotate and with the power split effective.

2 whereby the drive is through the primary stage, the drive to the output shaft and the inactivity of the secondary gear-set stage being assured by the overrunning clutch between the secondary stage ring gear and the output shaft.

FIGURE 3 is a longitudinal sectional view through a transmission mechanism employing the mechanism shown in the schematic drawings of FIGURES 1 and 2.

FIGURE 4 is a schematic view similar to FIGURE 1, but is a modified form of the invention in which selective braking means is provided to hold the primary carrier against rotation as distinguished from the primary ring gear, the brake not being actuated the primary stage is free to rotate making the split-power feature effective.

FIGURE 5 is a schematic view of the same modified form as in FIGURE 4, but with the brake actuated to hold the primary carrier against rotation.

FIGURE 6 is a longitudinal sectional view through a transmission mechanism employing the transmission, the principal features of which are shown in the schematic views of FIGURES 4 and 5.

Referring to the drawings and particularly to FIGURES 1 and 2, reference numeral 10 refers to a gas turbine rotor source of power connected to rotate an input high speed shaft 12. Two gear-set stages 14 (a primary stage) and 16 (a secondary stage) make up a two-stage split-power reduction gear. The primary gear-set stage 14 comprises: a central gear 18, rotating with the input high speed shaft 12; intermediate gears 20; carrier 22; and ring gear 24. The secondary stage 16 comprises: a central gear 26; intermediate gears 28; a fixed carrier 30; and a ring gear 32. The carrier 22 of the primary stage is connected to and rotates with output shaft section 34, while the carrier 30 of the secondary stage is a stationary carrier held from rotation by connection to the housing 36, as shown. The primary stage ring gear 24 is connected in positive rotative connection with the secondary stage central gear 26 by a connection 38. The secondary stage ring gear 32 is connected to the output shaft 34 by connections 40, 42 and overrunning clutch 44. The primary and secondary stages and connections, above described, comprise a two-stage split-power reduction when the primary stage is free to rotate and drive is carried through overrunning clutch 44 to shaft 34, as well as from carrier 22. This split-power flow through these two stages 14 and 16 to the output shaft section 34 provides the greater reduction in rotative speed from input shaft 12 to output shaft 34, that is, the lower gear. A brake 50, selectively operable by mechanism, such as hydraulic cylinder 51, to hold the primary gear-set stage ring gear 24 from rotation, is not actuated in the lower gear condition and the overrunning clutch 44 is constructed relative to the parts 40 and 42 so that with the brake 50 disengaged the overrunning clutch 44 will be engaged and part of the drive goes through the primary gear-set stage 14, by way of carrier 22, to the shaft 34. Another part of the drive is transmitted through the connection 38 to the secondary stage 16 and through the secondary stage ring gear connections 40, 42 and overrunning clutch 44 also to the output shaft 34 in the manner of the split-power reduction.

Referring to FIGURE 2, which is the same mechanism as shown in FIGURE 1, but with the brake 50 engaged by actuation of cylinder 51 to hold the primary stage ring gear 24 against rotation. Since the primary stage ring gear 24 is the means by which drive is transferred to the secondary stage 16, if such ring gear is held against rotation, there will be no transfer of such drive, and therefore all of the power will go through the primary stage to the output shaft 34 through the primary stage gear set 14 and the overrunning clutch 44 will allow such drive without disturbing the connection 40 to the secondary gear set stage. It is therefore possible to obtain high gear drive through the transmission by means of this actuation of the brake 50. The relative speeds of rotation of the several elements of the mechanism, shown in FIGURES 1 and 2 for low gear and high gear operation, is shown by the following table:

| Element | Low Gear, Fig. 1 | High Gear, Fig. 2 | Illustrative Approx. No. of Teeth in Gears |
|---|---|---|---|
| Brake 50 (on ring gear 24) | Free | Engaged | |
| Overrunning clutch 44 | Engaged | Overrunning | |
| Primary central gear 18 (input 12) | +1.00 | +1.00 | 36 |
| Primary intermediate gears 20 | −0.916 | −0.772 | 37 |
| Primary ring gear 24 | −0.1875 | 0 | 110 |
| Primary carrier 22 | +0.1059 | +0.247 | |
| Secondary intermediate gears 28 | +0.487 | 0 | 35 |
| Secondary ring gear 32 | +0.1059 | 0 | 160 |
| Output shaft 34 | +0.1059 | +0.247 | |

The above table shows relative speeds when the input shaft 12 is +1.00.

FIGURE 3 shows a longitudinal section through an illustrative transmission constructed in accordance with the schematic showing in FIGURES 1 and 2 and like reference characters have been applied to this figure.

FIGURES 4, 5 and 6 show a modified form of the invention. Referring to FIGURES 4 and 5, it appears that mechanism shown in schematic form is the same as that shown in FIGURES 1 and 2 with the exception that a brake 53 instead of a brake 50 is employed to hold component of the primary gear-set stage from rotation, and in this case the component so held is the primary stage carrier 22, while in the case of the FIGURES 1 and 2, the brake 50 in that case held the primary ring gear 24 against rotation. Another difference in the structure from FIGURES 1 and 2 is that the connection of the overrunning clutch 45 in this modification of FIGURES 4, 5 and 6 is connected to a shaft section 35 via connectors 41 and 43, while the output shaft 34 is directly connected by the connection 40 to the secondary stage ring gear 32. The shaft section 35 is connected to rotate with the primary stage carrier 22 and when the brake 53 is actuated, as it is shown in FIGURE 5, the primary stage carrier 22 does not rotate, and therefore the shaft section 35 and the inner portion 43 of the overrunning clutch 45 is also stationary so that in that case drive is through the secondary stage for high gear and there is no split power in the high gear, the two gear-set stages being operable in series.

The following table, similar in form to the previous one, shows conditions and the relative rotative speeds of the several elements of the transmission for low and high gear actuation corresponding to FIGURES 4 and 5.

| Element | Low Gear, Fig. 4 | High Gear, Fig. 5 | Illustrative Approx. No. of Teeth in Gears |
|---|---|---|---|
| Brake 50 (on carrier 22) | Free | Engaged | |
| Overrunning clutch 44 | Engaged | Overrunning | |
| Primary central gear 18 | +1.00 | +1.00 | 36 |
| Primary intermediate gears 20 | −0.916 | −0.976 | 37 |
| Primary ring gear 24 | −0.1875 | −0.328 | 110 |
| Primary carrier 22 | +0.1059 | 0 | |
| Secondary intermediate gears 28 | +0.487 | +0.853 | 35 |
| Secondary ring gear 32 | +0.1059 | +0.1852 | 16 |
| Output shaft 34 | +0.1059 | +0.1852 | |

FIGURE 6 shows the cross section through an illustrative transmission using the features shown in the schematic drawings of FIGURES 4 and 5, and like reference numerals have been applied to the illustrative structure.

It is noted that in both of the illustrative embodiments the components of the primary gear-set stage held from rotation by a brake may be generally classified as normally rotatable about a principal axis longitudinally coincident with the axis of rotation of the input shaft when the primary stage is left free to rotate. Also, in both embodiments there are connections to the output shaft, including a connection thereto from the secondary stage ring gear, and a connection thereto from the primary stage carrier and an overrunning clutch in the particular one of said connections which will allow transmission of drive to the output shaft when the brake on the primary stage component is engaged. That is, it is a fact that in the structure of FIGURES 4, 5 and 6 when the brake is on the primary stage carrier, for instance, the overrunning clutch in order to allow transmission of drive must be in the connection to the output shaft from the secondary stage ring gear; while if the brake is on the primary stage carrier, as in FIGURES 1, 2 and 3, then the overrunning clutch to effect drive must be in the connection from the primary stage carrier to the output shaft.

Both of the forms of the invention disclosed—particularly when considered as a transmission for use with a power element having relatively large values of rotative speed, such as the power turbine of a gas turbine engine—have definite advantages, as follows:

"Low" gear is the split-power configuration with resulting high over-all speed ratio capability, compactness, lightweight, and high efficiency.

The shift to "high" gear is accomplished by engaging a brake rather than a clutch, offering a simple and reliable design.

All brakes and clutches over-ride at low relative speeds.

Although the high speed input shaft may normally rotate at the very high speeds associated with a gas turbine prime mover, all other critical components in the transmission, including the planet carriers, rotate at moderate speeds.

In shifting from low to high gear, or from high to low gear, the power turbine is prevented from over-speeding, thereby permitting shifting under power.

The transmissions have an inherent "hill-holder" feature; i.e., if the vehicle is in forward drive on an adverse grade, and if the transmission is in high gear, the vehicle cannot roll backwards down the grade.

Relative merits of the two designs, i.e., brake on the primary ring gear (FIGS. 1, 2 and 3) as compared with brake on the primary carrier (FIGS. 4, 5 and 6), will now be considered. In favor of the brake on the ring gear design:

The secondary stage is stationary and unloaded in high gear, providing less wear in this stage and very satisfactory efficiency.

The high gear over-all speed ratio can differ from the low gear over-all speed ratio by almost any amount desired, or to put it in a more technical context, the step ratio can be made relatively high. (For instance, step ratio is defined as the result obtained by dividing the low gear over-all speed ratio by the high gear over-all speed ratio.)

Certain limitations on the brake on the ring gear type of unit are:

The over-all ratio in high gear is limited to that which can be obtained in a single planetary stage.

The primary carrier rotates at output shaft speed in high gear, which, if the output speed is sufficiently high, requires consideration in design due to the centrifugal loading on the planet bearings.

It is noted that in both types disclosed the primary carrier rotates in low gear, but this speed is the *"low gear"* output shaft speed.

Particular advantages of the type using the brake on the primary carrier are:

Very high over-all speed ratio in high gear is possible.
The primary carrier is stationary in high gear.

Limitations requiring consideration are:

A secondary stage is loaded in high gear.
Step ratios are limited to about 2.00 or less.

The invention has been described by reference to specific embodiments and certain modifications thereon, but it is further intended that additional modifications may be made without departing from the fundamental principles described within the scope of the following claims:

I claim:

1. In a multi-speed gear reduction transmission:
a split-power gear-set reduction between an input and an output shaft of the type comprising a primary and a secondary gear-set stage, each with a central gear, intermediate gears, a carrier and a ring gear, the primary gear-set carrier being normally planetary and the secondary gear-set stage having a fixed carrier, such primary and secondary gear-set stage split-power arrangement employing a drive connection between the primary stage ring gear and the secondary stage central gear and a rotative connection between the secondary stage ring gear and the output low speed shaft, said primary gear-set stage comprising two components including said carrier and said ring gear, both normally rotatable about a principal axis longitudinally coincident with the axis of rotation of said input shaft;

the combination therewith of:

a brake positioned for engagement to hold one of said normally rotatable components of said primary gear-set stage from rotation, thereby to effect a change in gear reduction between said input shaft and said output shaft;

connections to said output shaft including said connection thereto from said secondary stage ring gear and a connection thereto from said primary stage carrier;

and an overrunning clutch in the one of said connections to said output shaft allowing transmission of drive to said output low speed shaft when said brake is engaged.

2. In a multi-speed gear reduction transmission:
a split-power gear-set reduction between an input and output shaft of the type comprising a primary and a secondary gear-set stage, each with a central gear, intermediate gears, a carrier and a ring gear, the primary gear-set carrier being normally planetary and the secondary gear-set stage having a fixed carrier, such primary and secondary gear-set stage split-power arrangement employing a drive connection between the primary stage ring gear and the secondary stage central gear and a rotative connection between the secondary stage ring gear and the output low speed shaft, said primary gear-set stage comprising two components including said carrier and said ring gear, both normally rotatable about a principal axis longitudinally coincident with the axis of rotation of said input shaft;

the combination therewith of:

a brake positioned for engagement to hold said ring gear of said primary gear-set stage from rotation, thereby to effect a change in gear reduction between said input shaft and said output shaft;

and an overrunning clutch in said connection from said second stage ring gear to said output shaft.

3. In a multi-speed gear reduction transmission:
a split-power gear-set reduction between an input and output shaft of the type comprising a primary and a secondary gear-set stage, each with a central gear, intermediate gears, a carrier and a ring gear, the primary gear-set carrier being normally planetary and the secondary gear-set stage having a fixed carrier, such primary and secondary gear-set stage split-power arrangement employing a drive connection between the primary stage ring gear and the secondary stage central gear and a rotative connection between the secondary stage ring gear and the output low speed shaft, said primary gear-set stage comprising two components including said carrier and said ring gear, both normally rotatable about a principal axis longitudinally coincident with the axis of rotation of said input shaft;

the combination therewith of;

a brake positioned for engagement to hold said carrier of said primary gear-set stage from rotation, thereby to effect a change in gear reduction between said input shaft and said output shaft;

connections to said output shaft including said connection thereto from said secondary stage ring gear and a connection thereto from said primary stage carrier;

and an overrunning clutch in said connection from said primary stage carrier to said output shaft.

No references cited.